I. M. MARCY.
DIFFERENTIAL GEARING FOR AUTOMOBILES.
APPLICATION FILED NOV. 12, 1921.
1,427,612.
Patented Aug. 29, 1922.
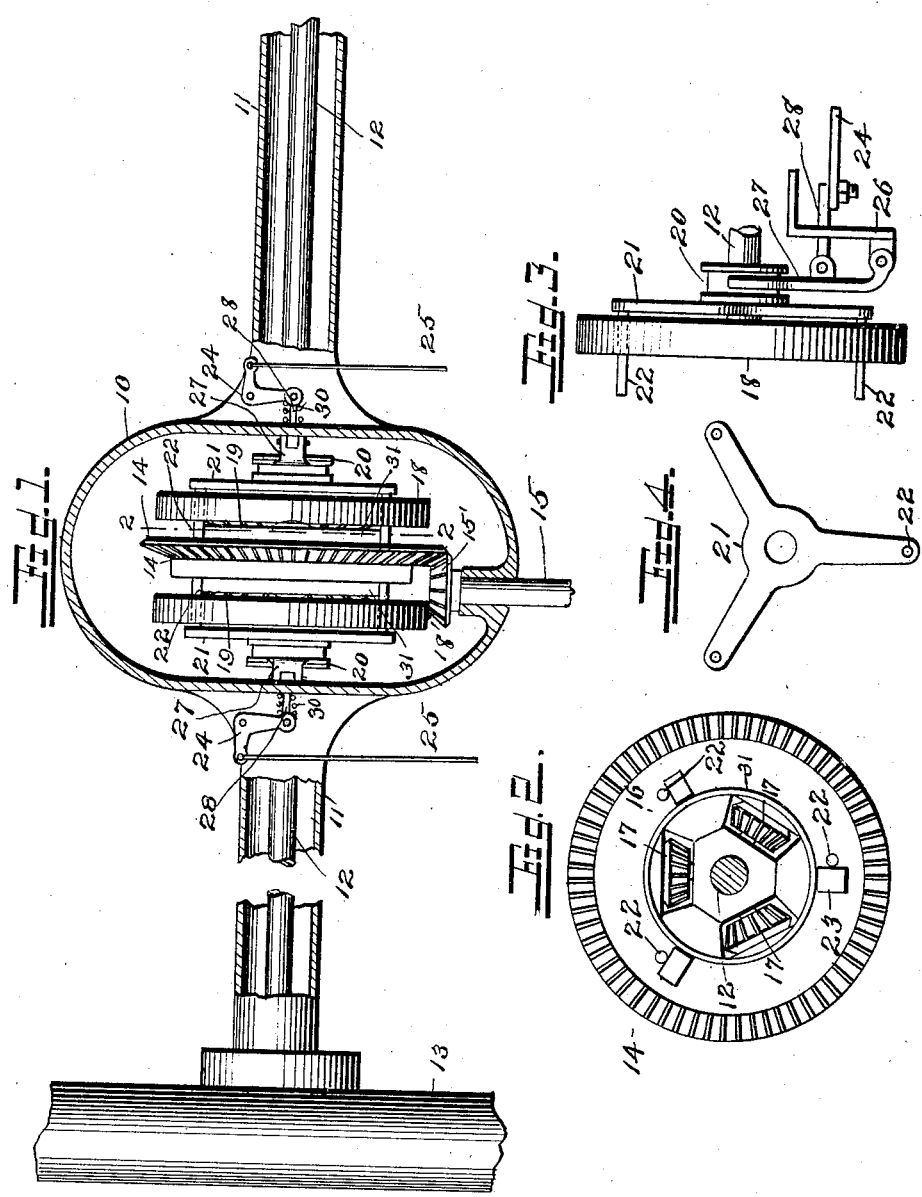

UNITED STATES PATENT OFFICE.

IRA M. MARCY, OF CHATTANOOGA, TENNESSEE, ASSIGNOR OF ONE-HALF TO ALEX N. LEVINE, OF CHATTANOOGA, TENNESSEE.

DIFFERENTIAL GEARING FOR AUTOMOBILES.

1,427,612.  Specification of Letters Patent.  Patented Aug. 29, 1922.

Application filed November 12, 1921. Serial No. 514,698.

*To all whom it may concern:*

Be it known that I, IRA M. MARCY, a citizen of the United States, residing at Chattanooga, in the county of Hamilton and State of Tennessee, have invented certain new and useful Improvements in Differential Gearings for Automobiles, of which the following is a specification.

This invention relates to automobiles and has special reference to a differential gearing for autos, auto trucks and all motor driven vehicles using a differential gear.

It is a well known fact that it frequently happens that an automobile will have one of its driving wheels in mud or other soft ground while the other driving wheel will be on perfectly good ground. In such cases there is no way of obtaining tractions with the ordinary differential gearing, because the wheel which is in the mud will spin around without the other wheel turning at all, this being on account of the usual planetary gear employed in such differentials.

One important object of the present invention is to provide an improved differential gearing wherein either of the driving wheels of the automobile may be positively locked to the main driving gear of the differential so that rotation of this main driving gear will effect rotation of the driving wheel.

At other times it so happens that the teeth on the bevel gears in the differential strip so that no driving can be effected on either of the driving wheels of the machine.

A second important object of the invention is to provide means whereby both of the driving wheels may be positively locked to the main gear of the differential so that both will rotate at the same speed.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:

Figure 1 is a section, partly in elevation, through the rear axle and differential housings of an automobile showing the differential mechanism in position therein.

Figure 2 is a detail section on the line 2—2 of Figure 1 certain of the parts being omitted.

Figure 3 is a view showing one-half of the locking mechanism, the view being taken at right angles to Figure 1.

Figure 4 is a detail side view of a certain spider employed herewith.

In carrying out the invention, in the embodiment herein shown, there is provided the usual differential housing 10 and the rear axle housings 11 each holding a rear axle section 12. On each of these sections there is provided a driving wheel 13, one of the wheels being omitted in the present showing for convenience of illustration. The differential employed consists of a main driving wheel 14 preferably driven by a shaft 15 and pinion 15'. Through this wheel extend openings 16 and in each of these openings is revolubly mounted bevel pinions 17. On the end of each wheel section 12 is mounted a disk 18 carrying a bevel gear 19 wherewith the pinions 17 mesh. Thus far the construction is substantially that of the ordinary differential gear. Slidably mounted on each of the axle sections 12 is a shipper collar 20 which supports a three armed spider 21 and from the ends of the spider pins 22 pass through guide openings in the respective disk 18. These pins are movable by the sliding of the shipper collar on its axle section into and out of the path of certain lugs 23 formed on the main driving gear 14. On the axle housings are pivoted bell crank levers 24 and from one arm of each of these levers a rod 25 extends forwardly of the automobile to a point adjacent the driver's seat. Within each axle housing there is provided a bracket 26 to which is pivoted the end of a shipper fork 27 which has its forked end engaging a respective collar 20. A link 28 connects the remaining arm of each bell crank 24 with a respective shipper form 27. Springs 30 are placed around the links 28 and serve to hold the shipper collar and spider in unlocked position. The main driving gear is further provided, around its central opening, with a double flange 31. This is an important feature of the device as it is essential to the stability and rigidity of the gear wheel.

It will be observed that whenever the pins 22 are projected into the path of the lugs 23 these pins will be engaged by said lugs whenever the main driving wheel 14 is rotated. Consequently upon such engagement the motion of the driving wheel 14 will be communicated directly to the respective disk 18, and thus to the respective wheel 13. With this in mind it will be seen that in case the right rear wheel of the machine is in a mud hole and the left wheel on solid ground it is merely necessary for the operator to move the rod 25 on the left side in such a way as to cause the pins 22 on that side to project into the path of the lugs 23. When this is done the disk 18 and wheel 13 will be constructed to move at the same speed as the main driving gear 14. In case the teeth on the pinions are stripped or the teeth on the gears 19 are stripped the operator then manipulates the rods 25 so as to clutch both of the disks 18 to the main driving wheel and thus the automobile will be driven just as though it had a solid axle.

There has thus been provided a simple and efficient device of the kind described and for the purposes specified.

It is obvious that minor changes may be made in the form and construction of the invention without departing from the material principles thereof. It is not, therefore, desired to confine the invention to the exact form herein shown and described, but it is wished to include all such as properly come within the scope claimed.

Having thus described the invention, what is claimed as new is:

1. In a differential for automobiles and for all motor driven vehicles using a differential gear, a main driving gear, wheel sections on opposite sides of the main driving gear, disks fixed to the ends of said axle sections in parallel relation to the main driving gear, lugs on the main driving gear, pins slidable through said discs to move into the path of said lugs, and means to selectively move said pins through the respective disks into and out of the path of said lugs.

2. In a differential for automobiles and for all motor driven vehicles using a differential gear, a main driving gear, wheel sections on opposite sides of the main driving gear, disks fixed to the ends of said axle sections in parallel relation to the main driving gear, lugs on the main driving gear, pins slidable through said discs to move into the path of said lugs, spiders each slidable on a respective axle section and having the pins passing through a respective disk fixed thereto, a shipper holder fixed to each spider and slidable with the spider on the axle section, a housing surrounding the differential and the axle sections, shipper forks each pivoted within the housing and each having a forked end engaging a respective shipper collar, bell crank levers each pivoted at its angle on the outside of the housing, links each connecting a respective shipper fork with one arm of a respective bell crank lever, and rods each extending forwardly from a lever to a point adjacent the operator's seat.

In testimony whereof I affix my signature.

IRA M. MARCY.